United States Patent
Siddiqui

(10) Patent No.: US 11,129,129 B2
(45) Date of Patent: Sep. 21, 2021

(54) APPARATUS, SYSTEMS, AND METHODS FOR DETERMINING A GEO-LOCATION

(71) Applicant: Qirfiraz Siddiqui, Castro Valley, CA (US)

(72) Inventor: Qirfiraz Siddiqui, Castro Valley, CA (US)

( * ) Notice: Subject to any disclaimer, the term of this patent is extended or adjusted under 35 U.S.C. 154(b) by 0 days.

(21) Appl. No.: 16/766,229

(22) PCT Filed: Dec. 10, 2019

(86) PCT No.: PCT/US2019/065462
§ 371 (c)(1),
(2) Date: May 21, 2020

(87) PCT Pub. No.: WO2020/123493
PCT Pub. Date: Jun. 18, 2020

(65) Prior Publication Data
US 2021/0051625 A1  Feb. 18, 2021

Related U.S. Application Data

(60) Provisional application No. 62/777,782, filed on Dec. 11, 2018, provisional application No. 62/798,754, (Continued)

(51) Int. Cl.
*H04W 64/00* (2009.01)
*H04W 4/02* (2018.01)
(Continued)

(52) U.S. Cl.
CPC .......... *H04W 64/006* (2013.01); *G01S 19/49* (2013.01); *G06N 3/02* (2013.01); *H04W 4/027* (2013.01); *H04W 4/029* (2018.02)

(58) Field of Classification Search
None
See application file for complete search history.

(56) References Cited

U.S. PATENT DOCUMENTS 6,369,545 B1 * 4/2002 Williams .................. H02J 7/35
320/101
2010/0259370 A1  10/2010 Chen et al.
(Continued)

FOREIGN PATENT DOCUMENTS

CN       102768361 A  * 11/2012
CN       102768361 A    11/2012
(Continued)

OTHER PUBLICATIONS

English translation of CN-102768361-A (Year: 2012).*
(Continued)

*Primary Examiner* — German Viana Di Prisco
(74) *Attorney, Agent, or Firm* — K&L Gates LLP

(57) ABSTRACT

Apparatus, systems and methods for determining a geo-location are provided. The apparatus comprises a receiver, a sensor, a processor, and a transmitter. The receiver is configured to receive a first geo-location. The sensor is configured to determine a change in a pose of the apparatus. The processor is operatively coupled to memory, the receiver, and the sensor. The processor is configured to determine a second geo-location based on the first geo-location and the sensor utilizing a neural network. The first transmitter is configured to output the second geo-location of the apparatus.

38 Claims, 8 Drawing Sheets

Related U.S. Application Data filed on Jan. 30, 2019, provisional application No. 62/872,262, filed on Jul. 10, 2019.

(51) Int. Cl.
*G06N 3/02* (2006.01)
*G01S 19/49* (2010.01)
*H04W 4/029* (2018.01)

(56) References Cited

U.S. PATENT DOCUMENTS

| | | | |
|---|---|---|---|
| 2014/0312242 A1 | 10/2014 | Valentino et al. | |
| 2015/0285637 A1* | 10/2015 | Kelly | G01C 21/12 |
| | | | 701/430 |
| 2016/0009276 A1* | 1/2016 | Moeller | B60W 50/14 |
| | | | 701/41 |
| 2016/0259061 A1 | 9/2016 | Carter | |
| 2016/0352726 A1* | 12/2016 | Hyde | H04W 12/082 |
| 2018/0206099 A1* | 7/2018 | O'Connor | G01S 19/49 |
| 2018/0276662 A1 | 9/2018 | Zavesky et al. | |
| 2019/0050956 A1* | 2/2019 | Kossin | H04L 9/0891 |
| 2019/0349433 A1 | 11/2019 | Smith et al. | |
| 2020/0151555 A1* | 5/2020 | Kozhaya | G06N 3/08 |

FOREIGN PATENT DOCUMENTS

| | | |
|---|---|---|
| CN | 206362937 U | 7/2017 |
| WO | 2018125989 A2 | 7/2018 |

OTHER PUBLICATIONS

International Search Report and Written Opinion for International PCT Application No. PCT/US2019/065462 dated Feb. 24, 2020.

* cited by examiner

APPARATUS, SYSTEMS, AND METHODS FOR DETERMINING A GEO-LOCATION

CROSS-REFERENCE TO RELATED APPLICATIONS

This application is a U.S. National Stage Entry under 35 U.S.C. § 371 of International Patent Application No. PCT/US2019/065462, entitled APPARATUS, SYSTEMS, AND METHODS FOR DETERMINING A GEO-LOCATION, filed Jan. 10, 2019, which claims benefit under 35 U.S.C. § 119 (e) to U.S. Provisional Application No. 62/777,782, titled "A Sensor-actuated, Deep Learning, Neural Network to Estimate Geo-Location & Micro-locations," filed Dec. 11, 2018, U.S. Provisional Application No. 62/798,754, titled "'No GPS' Technology," filed Jan. 30, 2019, U.S. Provisional Application No. 62/872,262, titled "'Location-estimating devices' & 'Location-broadcasting Beacons'," filed Jul. 10, 2019, and U.S. Provisional Application No. 62/942,218, titled "Network On-Ground Positioning System (NOGPS) & Sensor-actuated Neural Network to Estimate Geo-Location," filed Dec. 2, 2019, the entire contents of each is hereby incorporated herein by reference in their entirety.

BACKGROUND

A Global Position System (GPS) can be used to determine a geo-location of a GPS-enabled device. For example, a GPS-enabled device can receive GPS broadcasts from satellites orbiting 12,000 miles above the surface of the earth. There are challenges with the power requirements and accuracy of GPS-enabled devices.

SUMMARY

In an example, an apparatus for determining a geo-location is provided. The apparatus comprises a receiver, a sensor, a processor, and a transmitter. The receiver is configured to receive a first geo-location. The sensor is configured to determine a change in a pose of the apparatus. The processor is operatively coupled to memory, the receiver, and the sensor. The processor is configured to determine a second geo-location based on the first geo-location and the sensor utilizing a neural network. The first transmitter is configured to output the second geo-location of the apparatus.

In another example, a network for determining a geo-location is provided. The network comprises a node and a mobile device. The node comprises a transmitter configured to output a current geo-location of the node via a wireless communication protocol. The wireless communication protocol comprises a near field communication protocol, a Bluetooth low energy protocol, a Wi-Fi protocol, or a ZigBee protocol, or combinations thereof. The mobile device comprises a receiver, a sensor, and a processor. The receiver is configured to receive the current geo-location of the node via the wireless communication protocol. The sensor is configured to determine a change in a pose of the mobile device. The processor is operatively coupled to memory, the receiver, and the sensor. The processor is configured to determine a current geo-location of the mobile device based on the current geo-location of the node and the sensor utilizing a neural network.

FIGURES

The novel features of the various aspects described herein are set forth with particularity in the appended claims. The various aspects, however, both as to organization and methods of operation may be better understood by reference to the following description, taken in conjunction with the accompanying drawings as follows:

DETAILED DESCRIPTION

Figure 1:
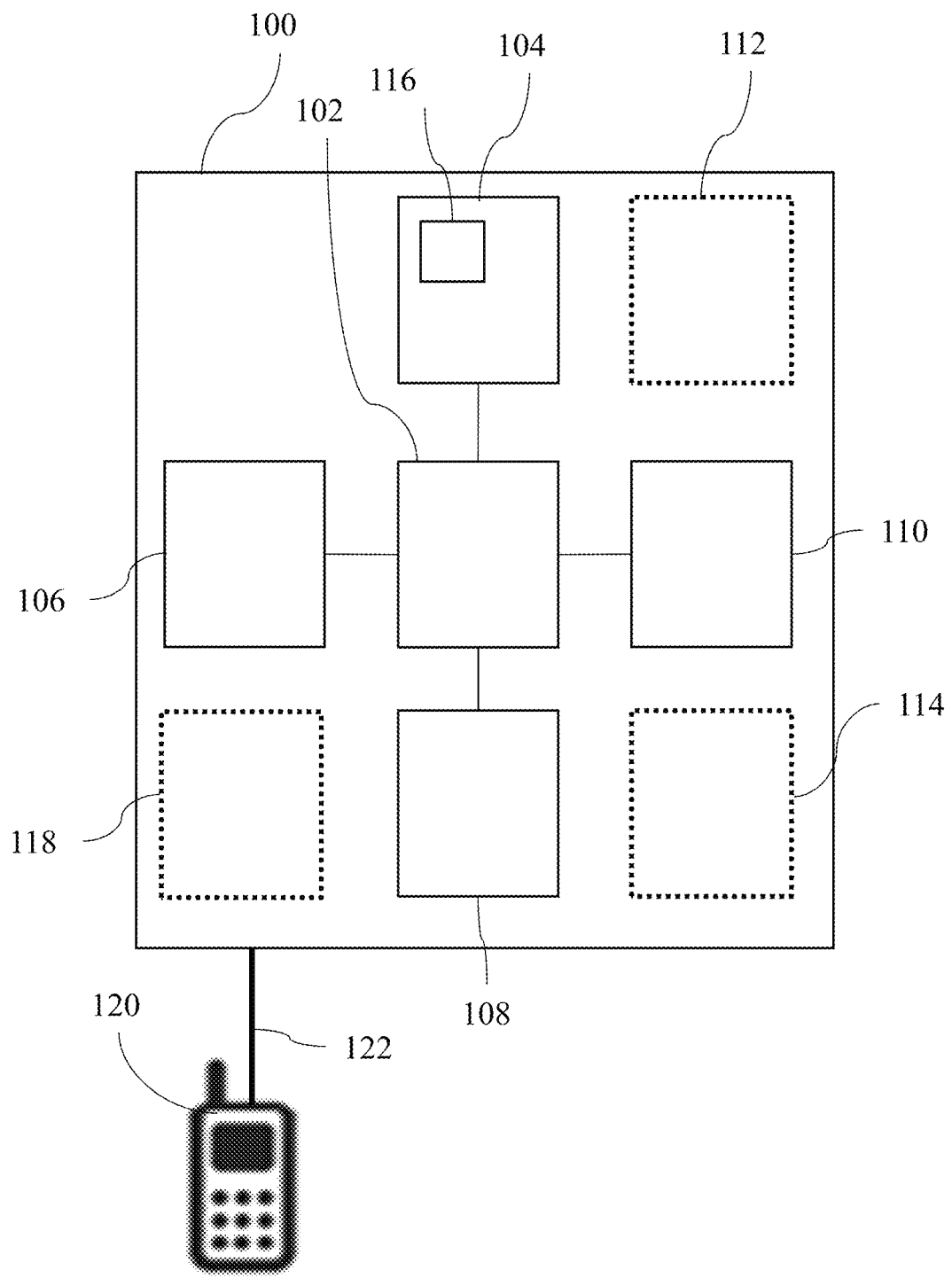
FIG. 1 illustrates an example of a system diagram of a location-enabled apparatus for determining a geo-location according to the present disclosure.

Various examples are described and illustrated herein to provide an overall understanding of the structure, function, and use of the disclosed articles and methods. The various examples described and illustrated herein are non-limiting and non-exhaustive. Thus, an invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various examples disclosed and described in this specification can comprise, consist of, or consist essentially of the features and characteristics as variously described herein.

Any references herein to "various examples," "some examples," "one example," "an example," or like phrases mean that a particular feature, structure, or characteristic described in connection with the example is included in at least one example. Thus, appearances of the phrases "in various examples," "in some examples," "in one example," "in an example," or like phrases in the specification do not necessarily refer to the same example. Furthermore, the particular described features, structures, or characteristics may be combined in any suitable manner in one or more examples. Thus, the particular features, structures, or characteristics illustrated or described in connection with one example may be combined, in whole or in part, with the features, structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

A location-enabled device may comprise a global positioning system (GPS) receiver in order to determine its geo-location. However, the GPS receiver can require a large amount of power (e.g., over 100 milliamps (mA) of current) in order to process GPS broadcasts from satellites and determine the geo-location of the location-enabled device. Additionally, the GPS receiver has to keep polling, after regular intervals, in order to keep the geo-location updated, thereby consuming additional power. Moreover, GPS receives typically remain in an "ON" state, since the GPS receives take a long time (e.g., over 1 minute) to become operational. Many location-enabled devices, such as, for example, cellular phones have other energy intensive functionality, such as, for example, a screen, a speaker, and an indicator (e.g., LED). Thus, reducing energy consumption of a location-enabled device can be advantageous to enable increased battery life.

The inventor of the present disclosure has determined that limiting use of the GPS receivers can reduce energy consumption of location-enabled devices. For example, utilizing a sensor configured to determine a change in a geo-location of the location-enabled device that requires less current than a GPS receiver can be advantageous. For example, a low power sensor for determining a geo-location, such as, for example, a micro-electro-mechanical system (MEMS) accelerometer, can require a low current to operate (e.g., less than or equal to a dozen or fewer micro-amps ($\mu$A)). Thus, utilizing the low power sensor for determining the geo-location of the location-enabled device instead of the GPS receiver can reduce energy consumption of the location-enabled device. However, typical accelerometer only geo-location approaches can be inaccurate.

Thus, the present disclosure provides a location-enabled apparatus comprising a neural network and a sensor configured to determine a change in a pose of the location-enabled apparatus while reducing power consumption. The location-enabled apparatus can have its geo-location initialized (e.g., by a GPS receiver, a node of a network, other device). After the initialization of the geo-location, the neural network can determine a change in the pose of the location-enabled device from the initialized geo-location utilizing the sensor. The change in pose can be used to determine a current location of the location-enabled apparatus without having to utilize a GPS receiver. Therefore, a reduction in energy required to determine the geo-location of the location-enabled device could be achieved.

Additionally, the location-enabled device according to the present disclosure can be trained by periodically providing the observed geo-location (e.g., correct, accurate, actual) using a GPS receiver, a node of a network, and/or other observed geo-location providing device. The accuracy of the geo-location determination of the location-enabled device according to the present disclosure can increase as more observed geo-locations are provided to the neural network during training (e.g., fine-tune the algorithm inside the neural network).

FIG. 1 illustrates an example of a system diagram of a location-enabled apparatus 100 for determining a geo-location according to the present disclosure. The apparatus 100 can comprise a processor 102 (e.g., a microcontroller unit (MCU)), memory 104, a receiver 106, a transmitter 108, a sensor 110, and a neural network 116. The processor 102 can be operatively coupled to the memory 104, the receiver 106, the transmitter 108, and the sensor 110.

The memory 104 can be non-transitory memory and can comprise machine executable instructions that when executed by the processor 102 can cause the processor 102 to perform the functions of a neural network 116, various algorithms, and other innovations described herein. The memory 104 can comprise any machine-readable or computer-readable media capable of storing data, including both volatile and non-volatile memory. For example, memory 104 may include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information. In various examples, the memory 104 can be secure memory, such as, for example, write once ready many (WORM) memory, a block-chain enabled memory, or other safe storage memory, or combinations thereof.

The receiver 106 can be configured to receive a first geo-location. As used herein, a "geo-location" is a position (e.g., longitude, latitude, altitude) and/or an orientation of an object with respect to the earth. The first geo-location can be an initial geo-location, a current geo-location, a recent geo-location, an observed geo-location, or combinations thereof. Thereafter, the first geo-location can be stored in memory 104. The receiver 106 can be configured to receive the first geo-location via a first wireless communication protocol or a wired communication protocol, or combinations thereof. The wireless communication protocol can comprise a near field communication protocol, a Bluetooth low energy protocol (e.g., 2.4 MHz), a Wi-Fi protocol (e.g., 800 MHz), or a ZigBee protocol, or combinations thereof.

The sensor 110 can be configured to measure a change in the pose (e.g., position and/or orientation) of the apparatus 100. The change in pose can be in at least two degrees of freedom, such as, for example, at least three degrees of freedom, at least four degrees of freedom, or at least five degrees of freedom. In various examples, the change in pose can be in six degrees of freedom. The sensor 110 can comprise an accelerometer, an inertial measurement unit, a gyroscope, or a magnetometer, or combinations thereof. The sensor 110 can output measured changes in pose as pose signals to the processor 102 for processing utilizing the neural network 116. In various examples, the sensor 110 can output a pose signal to the processor 102 that the apparatus 100 has not moved.

The processor 102 can process the pose signals from the sensor 110 utilizing the neural network 116 and based on the first geo-location can determine a second geo-location of the apparatus 100. The second geo-location can be a current geo-location, a recent geo-location, or an estimated geo-location, or combinations thereof.

The neural network 116 can be stored in memory 104 as illustrated in FIG. 1 or a remote device (not shown). The neural network 116 receive pose data from the sensor 110 and process, in conjunction with the processor 102, the pose data into a change vector (e.g., direction and magnitude of change in pose). For example, the neural network 116 can comprise artificial neurons that can be connected together utilizing edges. The artificial neurons can be arranged in at least two layers. For example, one of the layers can be an input layer, which can receive pose data, and a different one of the layers can be an output layer, which can provide an output. A propagation function at each artificial neuron can compute an output based on a predefined weight associated with each input to that artificial neuron (e.g., pose data, predecessor artificial neuron output) and a bias can be used to adjust to the resulting output of the artificial neuron. The resulting output of the neural network 116 can be the change vector. Thereafter, the processor 102 can receive the change vector and based on the first geo-location (e.g., previous location) determine the second geo-location.

The processor 102 can be a central processing unit (CPU). The processor 102 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a vector co-processor, a microprocessor such as a complex instruction set computer (CISC) microprocessor, a reduced instruction set computing (RISC) microprocessor, and/or a very long instruction word (VLIW) microprocessor, or other processing device. The processor also may be implemented by a controller, a microcontroller, an application specific integrated circuit (ASIC), a field programmable gate array (FPGA), a programmable logic device (PLD), and so forth. The processor 102 can be configured to run an operating system (OS) and various other applications.

The processor 102 may be arranged to receive information through a communications interface. The communications interface may comprise any suitable hardware, software, or combination of hardware and software that is capable of coupling the processor 102 to another component of the apparatus 100, a network, or other device, or combinations thereof. For example, the processor 102 can receive information, such as, for example, the first geo-location through the receiver 106 and pose signals from the sensor 110. As stated herein, the processor 102 can determine a second geo-location of the apparatus 100 based on the first geo-location and the sensor 110 (e.g., pose signals from the sensor 110) utilizing the neural network 116. For example, the processor 102 in conjunction with the sensor 110 can measure a change in pose of the apparatus 100 relative to the first geo-location and thereby determine the second geo-location based on a change from the first geo-location.

The processor 102 can store the first geo-location, the second geo-location, or the pose signals, or combinations thereof in the memory 104. For example, the processor 102 can be configured to store the first geo-location in the memory 104 and the processor 102 can be configured to overwrite the first geo-location with the second geo-location in the memory 104.

Figure 2:
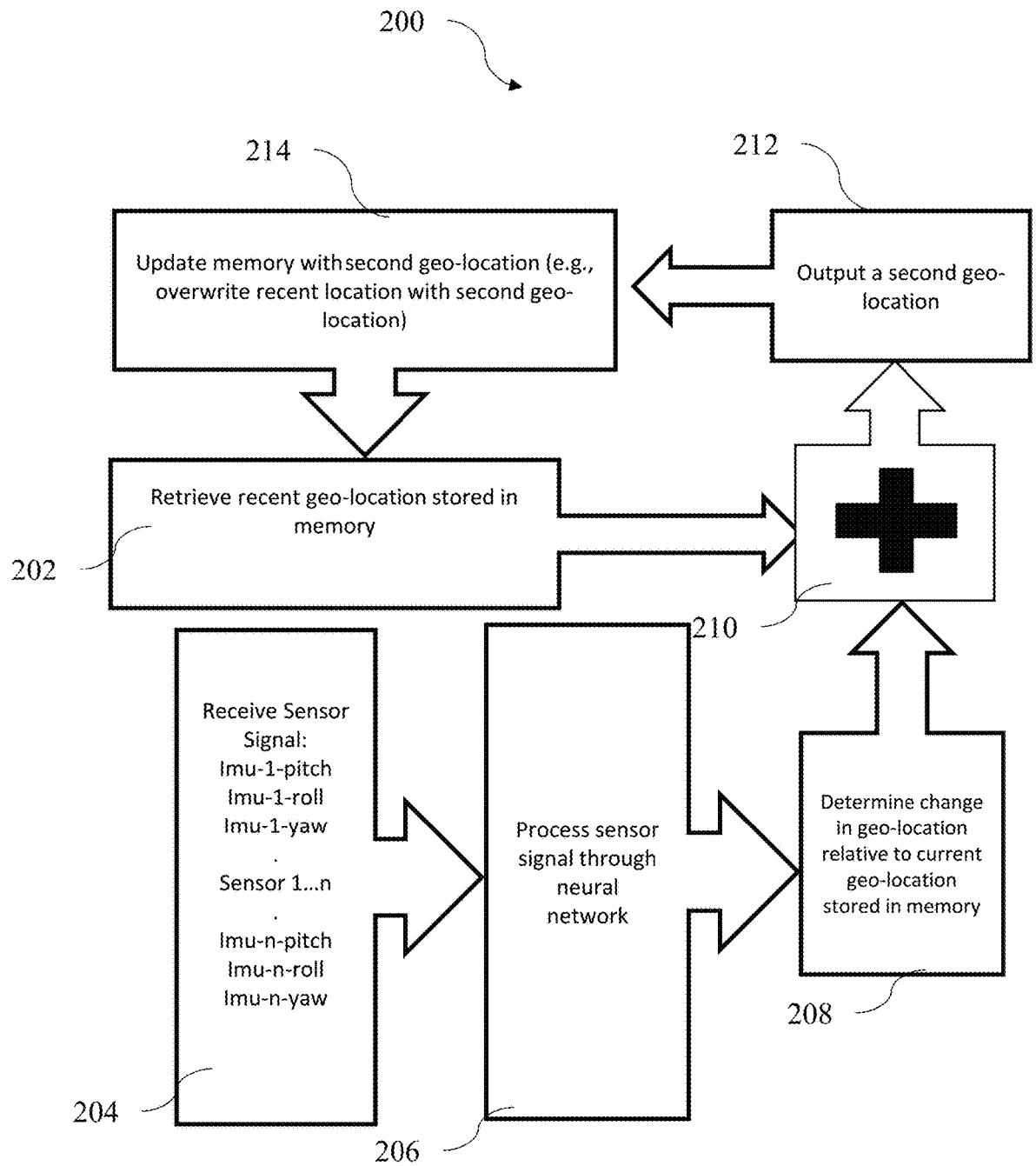
FIG. 2 illustrates an example of a process diagram for determining a second geo-location according to the present disclosure.

A process diagram 200 of the processor 102 determining the second geo-location is shown in FIG. 2. As illustrated, a recent geo-location can be retrieved 202 from memory. In various examples, the recent geo-location can be the first geo-location received by the receiver 106 or a recently determined second geo-location. As the apparatus 100 is moved, the sensor 110 can output pose signals, which can be received 204 by the processor 102. Thereafter, the processor 102 can process 206 the pose signals utilizing the neural network 116. In various examples, the neural network 116 may be pre-trained as illustrated in FIG. 3 and described herein and/or fine-tuned as illustrated in FIG. 4 and described herein or combinations thereof.

The processor can determine 208 a change vector of the apparatus 100 utilizing the neural network 116 relative to the recent geo-location stored in memory based on the processed 206 pose signals. In order for the processor 102 to accurately calculate the change vector, the pose signals processed 206 by the processor 102 should account for any movements between the recent geo-location stored in memory and the current location of the apparatus 100. Thereafter, the processor 102 can determine 210 a second geo-location based on the recent geo-location retrieved from memory 104 and the determined change vector. The processor 102 can output 212 the second geo-location and update 214 the memory with the second geo-location at step 214. For example, the processor 102 can overwrite the recent geo-location with the second geo-location, thereby the second geo-location becomes the recent geo-location for another iteration of the process diagram 200 as illustrated in FIG. 2. Another iteration of the process diagram 200 as illustrated in FIG. 2 can be performed based on a desired frequency, a triggering event (e.g., activation of an energy harvesting device as described herein), or other parameter, or combinations thereof.

Figure 3:
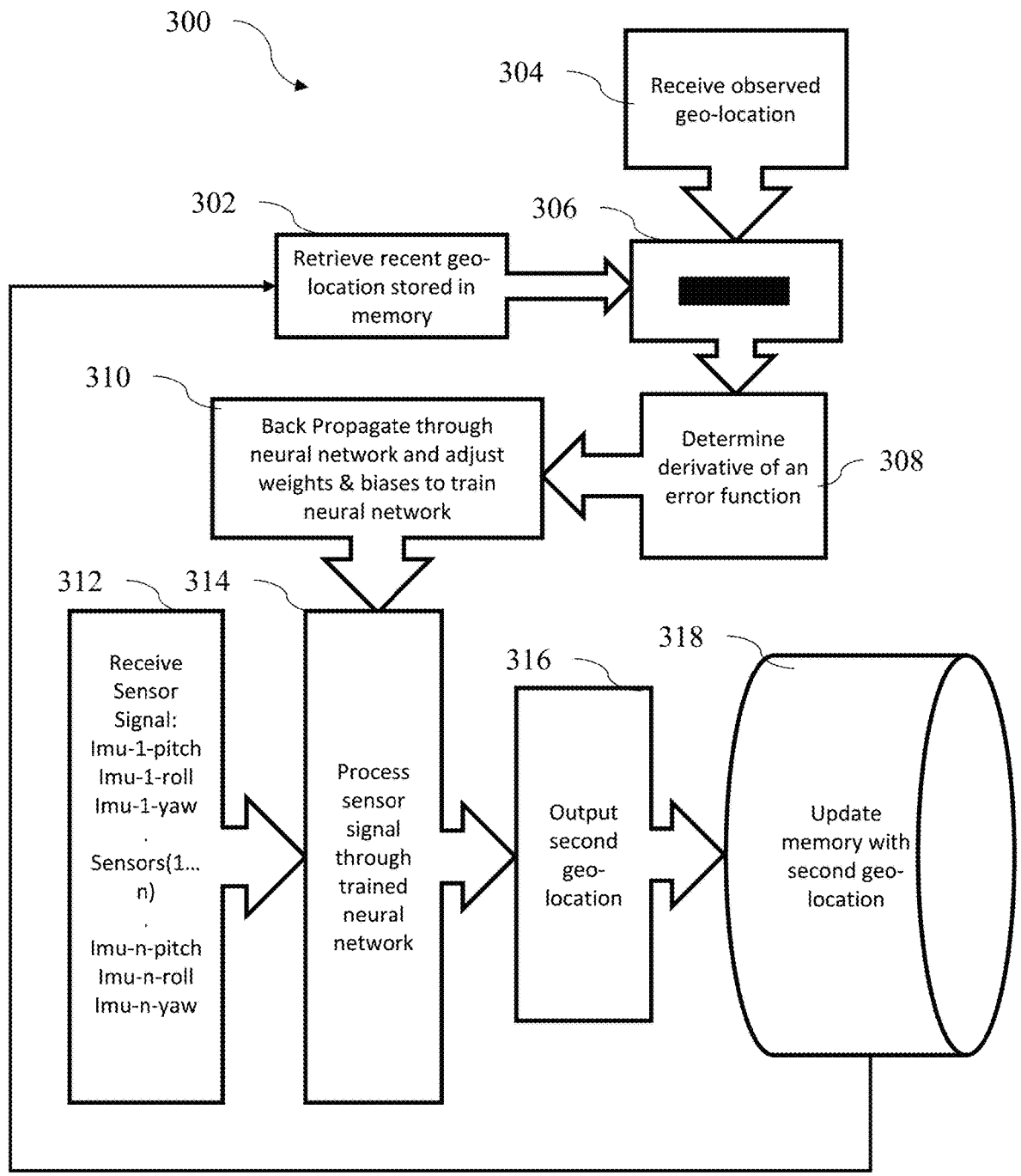
FIG. 3 illustrates an example of a process diagram for training the neural network according to the present disclosure.
Figure 4:
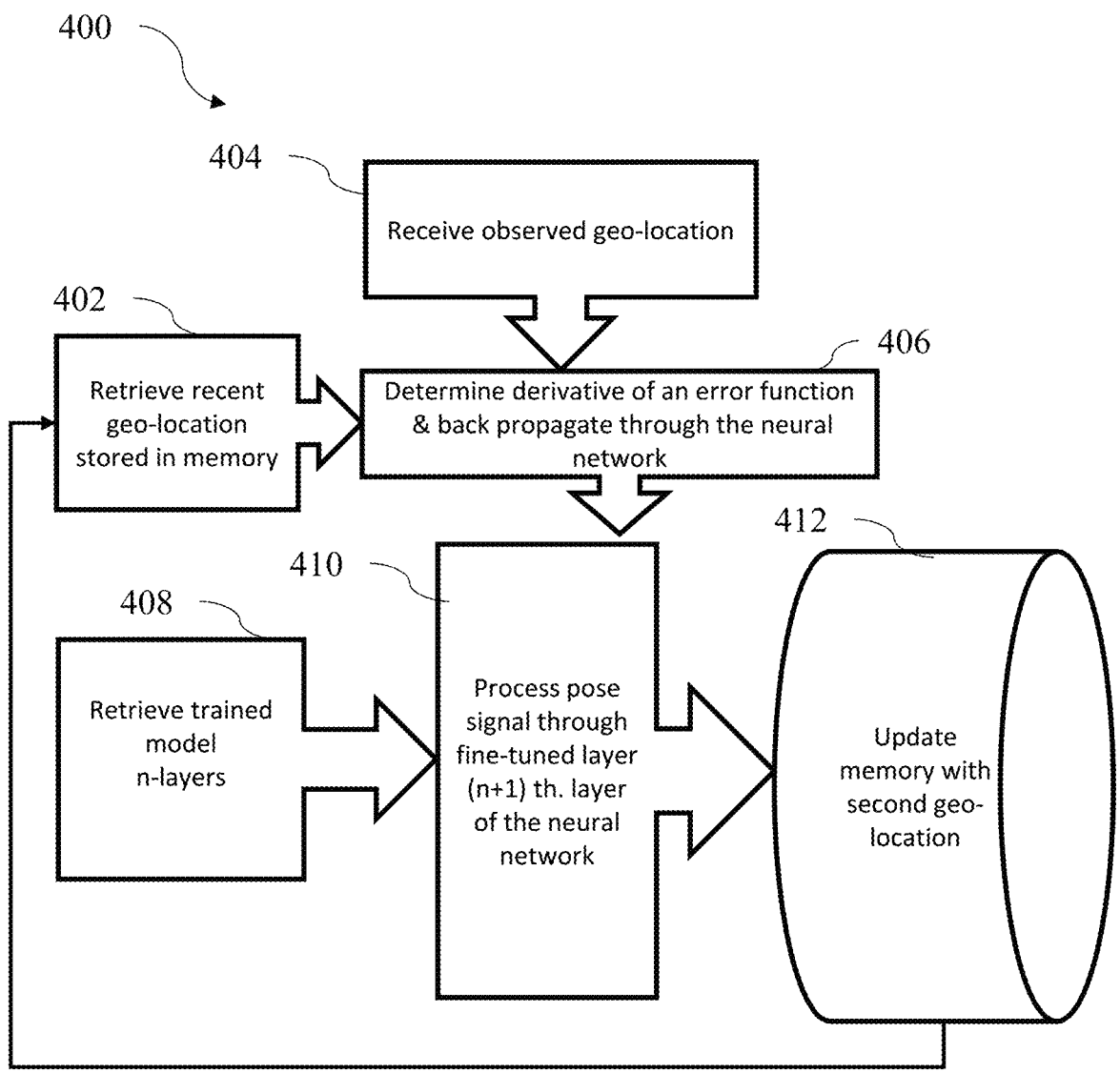
FIG. 4 illustrates an example of a process diagram for fine tuning the neural network according to the present disclosure.

The neural network 116 of the apparatus 100 can be trained as the process diagram 300 illustrated in FIG. 3 and described herein such that the second geo-location output can be accurate (e.g., substantially similar to the observed geo-location of the apparatus 100). In various examples, the receiver 106 can be configured to receive an observed geo-location and the processor 102 can be configured to train the neural network 116 with the observed geo-location. For example, the processor 102 can be configured to train the neural network 116 by adjusting weights and biases in the neural network 116.

For example, a process diagram 300 of the processor 102 training the neural network 116 is shown in FIG. 3. As illustrated, a recent geo-location can be retrieved 302 from memory and an observed geo-location (e.g., correct observed geo-location) can be received 304. The recent geo-location and the retrieved geo-location are provided 306 to the processor 102 for processing in order to determine the difference, if any, between the current geo-location and the observed geo-location (e.g., compared). Thereafter, the processor 102 can back propagate any observed error through the neural network 116. For example, the processor 102 can determine 308 a derivative of an error function (e.g., loss function) of the difference determined. Thereafter, the processor 102 can back propagate 310 updates to the neural network utilizing a gradient descent algorithm to adjust weights and biases in the neural network 116. The adjustment of the weights and biases can be an initial training of the neural network 116 or a re-training of the neural network 116.

Thereafter, the trained neural network 116 can process 314 the sensor signal from the sensor 110 (e.g., re-process) from received 312 sensor signals and determine a change in geo-location relative to a previous geo-location stored in memory (e.g., previous to the recent geo-location). The processor 102 can output 316 the second geo-location and update 318 the memory with the second geo-location in memory. Another iteration of the process diagram 300 as illustrated in FIG. 3 can be performed based on a desired number of iterations, an error calculated between the output second geo-location and the observed geo-location, or other parameter, or combinations thereof. After training in FIG. 3, the neural network 116 can be considered trained and the neural network 116 can be coded into other apparatus.

After the neural network 116 is trained, the neural network 116 can be fine-tuned in a desired apparatus. The fine-tuning may also occur at a desired frequency in the respective apparatus. A process diagram 400 of the processor 102 fine-tuning the neural network 116 in apparatus 100 is shown in FIG. 4. As illustrated, a recent geo-location can be retrieved 404 from memory at step 402 and an observed geo-location can be received. The recent geo-location and the retrieved geo-location are provided 406 to the processor 102 for processing. For example, the processor 102 can determine a derivative of an error function on the observed geo-location and back propagate the derivative of the error function through the neural network 116.

Thereafter, a trained layer of the neural network 116 can be retrieved 408 and can be fine-tuned with the adjusted weights and biases. The processor 102 can process 410 pose signal from the sensor 110 (e.g., re-process). For example, the processor can determine a change vector relative to a current geo-location stored in memory utilizing the fine-tuned neural network and determine a second geo-location of the apparatus 100. The processor 102 can output 412 the second geo-location and update the memory with the second geo-location. In various examples, the processor 102 can determine an error-level in in the second geo-location relative to the previous recent geo-location and output the observed geo-location if the error-level is greater than or equal to a threshold. In various other examples, if an error-level in in the second geo-location relative to the current geo-location is less than the threshold, the processor 102 can output the second geo-location.

Another iteration of the process diagram as illustrated in FIG. 4 can be performed based on a desired number of iterations, an error calculated between the recent geo-location and the observed geo-location, a desired frequency, or other parameter, or combinations thereof.

Referring again to FIG. 1, in various examples, the transmitter 108 can be configured to output the second geo-location of the apparatus 100. The second geo-location can be the same the first geo-location or a different geo-location. For example, if the apparatus 100 did not move from when the apparatus 100 received the first geo-location, the second geo-location may be the same as the first geo-location. The transmitter 108 can be is configured to output the second geo-location via a first wireless communication protocol or a wired communication protocol, or combinations thereof. The wireless communication protocol can comprise a near field communication (NFC) protocol, a Bluetooth low energy (BLE) protocol (e.g., 2.4 MHz), a Wi-Fi protocol (e.g., 800 MHz), or a ZigBee protocol, or combinations thereof. The transmission of the second geo-location can be secured or unsecured depending on the application.

The receiver 106 and/or the transmitter 108 can comprise a wireless communication circuit, which can be a mobile chipset radio frequency (RF) wireless circuit, or simply cellular radio. The wireless communication circuit may be a low power chipset and can be configured to connect to a network as well as another device 120 (e.g., a mobile device such as, a cell-phones, a smart phone, a tablet computer, a laptop computer, a gateway device, among others). The wireless communication circuit can comprise an antenna to receive and transmit wireless signals, a transmitter circuit, or a receiver circuit, or combinations thereof.

Figure 5:
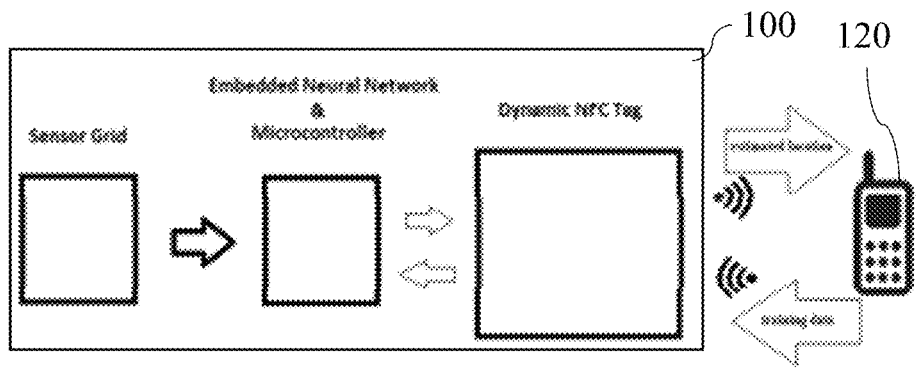
FIG. 5 illustrates an example of a system diagram of a location enabled apparatus for determining a geo-location according to the present disclosure which can receive an observed geo-location from a device and transmit a second geo-location to the device.
Figure 6:
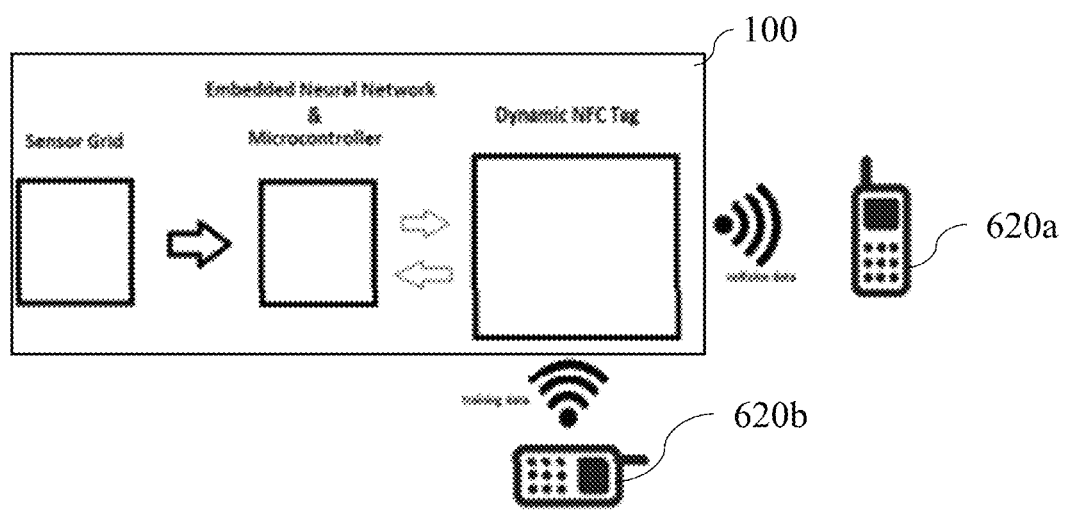
FIG. 6 illustrates an example of a system diagram of a location enabled apparatus for determining a geo-location according to the present disclosure which can transmit the second geo-location to a first device and receive an observed geo-location from a second device.

As illustrated in FIG. 1, the device 120 can be in communication with the apparatus 100 via a link 122. The device 120 can receive the second geo-location from the apparatus 100 and transmit an observed geo-location (e.g., training data) to the apparatus 100 as illustrated in FIG. 5. In various examples, as illustrated in FIG. 6, a plurality of devices can be in communication with the apparatus, and a first device 620a can receive the second geo-location and a second device 620b can transmit an observed geo-location to the apparatus 100.

The apparatus 100 can be configured as a NFC-BLE beacon. For example, the receiver 106 can wirelessly communicate via NFC and the transmitter 108 can wirelessly communicate via BLE.

The apparatus 100 can comprise an energy-harvesting device 112, which can comprise a piezoelectric energy-harvesting device, an electrostatic energy-harvesting device, an electromagnetic energy harvesting device, a photovoltaic cell, or a radio frequency (RF) energy harvesting device, or combinations thereof. For example, if the apparatus 100 is positioned near a road, traffic on the road can cause vibrations, which can be converted by the energy-harvesting device 112 into electricity to power the apparatus 100. In various other examples, the apparatus can be attached to a car and the car and vibrate (e.g., from moving, engine vibrations) and the vibrations can be converted into electricity by the energy harvesting apparatus. The amount of power generated by the energy-harvesting device 112 can be suitable to power the apparatus 100 to determine the second geo-location (e.g., compute a longitude and a latitude).

In various examples, the apparatus 100 can transmit the second geo-location whenever the energy-harvesting device 112 provides power to the apparatus 100 (e.g., when it receives vibrations from the road). At other times, the apparatus 100 may not output the second geo-location in order to save power.

In various examples where the apparatus 100 is battery-less, comprises an RF harvesting device and is configured to transmit the second geo-location via BLE, the apparatus 100 can be utilized in a fixed location, such as, for example, as a house number, a door bell, a pole, a wall, a traffic signal, a sidewalk, a transit station, or a public place, or combinations thereof.

The apparatus 100 can comprise a GPS receiver 118. The GPS receiver 118 can be configured to provide an observed geo-location to the apparatus 100 in order to train the neural network 116 as illustrated in FIG. 3 and described herein. For example, the GPS receiver 118 can provide an observed geo-location for processing by the processor 102. In various examples, it may be desirable to limit the operation of the GPS receiver 118 in order to reduce power consumption of the apparatus 100.

The apparatus 100 can comprise circuits designed to interface with various sensors and combinations of components of the apparatus 100. For example, the apparatus 100 can provide a combination of analog front-end, vector/digital signal processing, microprocessor and memory in a low-power ASIC/chip that can comprise multiple functions, such as, for example, geo-location determination, neural network training, neural network fining tuning, among others. The apparatus 100 can comprise various components and modules to support the functionality of the apparatus 100, such as, for example, a printed circuit board assembly, a universal serial bus (USB), a connection port to external devices and/or sensors, and a hardware accelerator, data memory, serial interfaces such as, for example, SPI, universal asynchronous receiver transmitter (UART), two-wire multi-master serial single ended bus interface (I2C), general purpose input/output (GPIO), a real-time clock, a control circuit, an analog-to-digital converter (ADC), gain and conditioning circuits, drivers, among other components.

In various examples, the apparatus 100 can comprise a battery 114 and the neural network 116 can be embedded in the battery 114 (not shown). In various examples, the memory 104, processor 102, and sensor 110 can be embedded in the battery 114. Therefore, the apparatus 100 can be maintained in an "ON" state and thus can keep updating the geo-location of the apparatus 100 whenever apparatus 100 including the battery 114 is moved. In various examples, the initial location of apparatus 100 including the battery 114 can be "seeded" at the time of manufacturing (e.g., received by the receiver 106 and stored in memory 104 during manufacturing) or at a later time.

The neural network 116 can be embedded in a Battery Management System (BMS) of the battery 114. The sensor 110 can track the movement of the battery 114 and the processor 102 utilizing the neural network 116 can continually update the geo-location based on the pose signals from the sensor 110. Thus, any device comprising the location-enabled apparatus according to the present disclosure including a battery can utilize the location-enabled apparatus for power and a current geo-location.

In various examples where the neural network 116 is embedded in battery 114, the receiver 106 can sniff a node as described herein (e.g., a location-Beacon) and receive an observed geo-location from the node to train the neural network 116 (e.g., back-propagation). Thus, the battery 114 can comprise circuitry to train neural network 116 such that the battery 114 can be a self-training, independent, location-estimation unit and may not require communication with a mobile device to train the neural network 116.

The location-enabled apparatus according to the present disclosure can be integrated into a mobile device. For example, as illustrated in the application diagram 700 shown in FIG. 7, a mobile device comprising the functionality of the location-enabled apparatus according to the present disclosure can be integrated with a location-enabled battery and a location-enabler application for execution by the mobile device. As shown in the application diagram 700 a location-enabler application 702 may receive an observed geolocation 704 for fine tuning (when required) from a location enabled apparatus 706 or from GPS satellites 708 (up in the sky). The location-enabler application 702 also may receive estimated location 710 from a location-enabled battery 712. Also, the location-enabler application 702 may provide back propagation 714 to the location-enabled battery 712. In addition, the location-enabler application 702 may receive motion data 716 from a smartphone 718 and provide an estimated location 720 to the smartphone 718. The location-enabler application 702 provide the estimated location 720 utilizing a neural network within the location enabler application 702 and a processor of the smartphone 718. In various examples, the location-enabler application 702 can be located on the smartphone 718.

In certain examples, when the smartphone 718 utilizes an Android OS, the location-enabler application 702 can run as a "background service" which can be invisible to an end-user. In various examples, when the smartphone 718 utilizes an OS besides Android, multi-tasking can be allowed and the location-enabler application 702 can be configured as a local server. In certain examples, phone manufacturers can provide the location-enabler application 702 bundled along-with their respective OSes.

Figure 8:
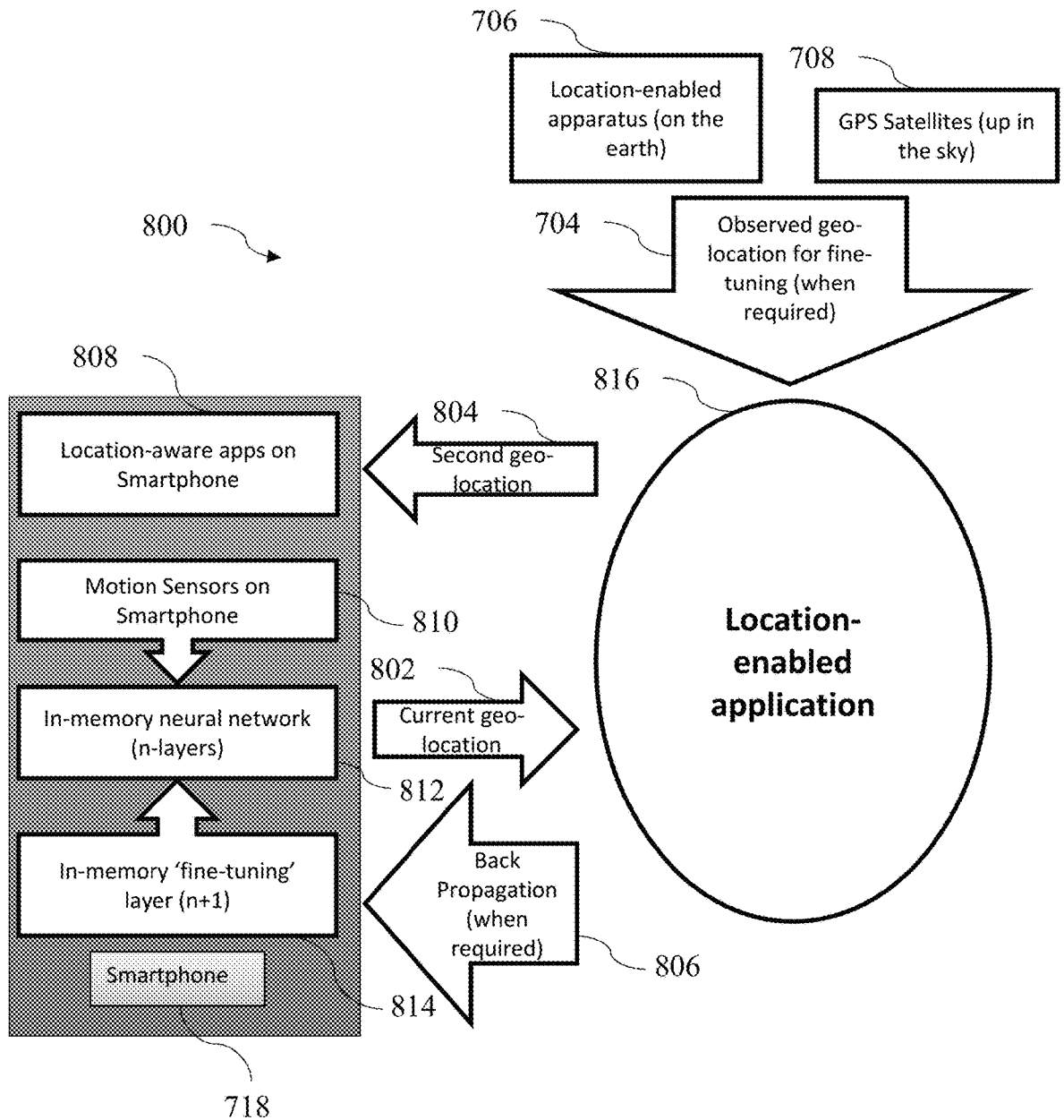
FIG. 8 illustrates an example of a process diagram for a mobile device comprising the functionality of the location-enabled apparatus according to the present disclosure and a location-enabled application.

In various examples, as illustrated in the application diagram 800 shown in FIG. 8, a mobile device comprising the functionality of the location-enabled apparatus according to the present disclosure and a location-enabled application 816 for execution by the mobile device is provided. The location-enabled apparatus according to the present disclosure can be performed by a service running in the background of the mobile device. The mobile device can comprise an Android operating system, an iOS, or other operating system, or combinations thereof. The location-based application 816 can receive the current geolocation 802 form the smartphone 718 and provide a second geolocation 804 to the smartphone 718 along with back propagation 806 when required. The smartphone 718 includes location-aware applications 808 as well as an in-memory neural network 810 which receives information from motion sensors 810 on the smartphone 718 and in-memory 'fine tuning' layer (n+1) 814.

The location-enabler application 702 (e.g., NOGPS app) can be a link between a fixed location beacon and a neural network according to the present disclosure. The NOGPS app can provide location information to other applications on the mobile device (e.g., location enabled application 816), such as, for example, a navigation application (e.g., Maps, Waze), a location service, or SOS service, a gaming application, or combinations thereof which may require a geo-location of the mobile device. The NOGPS app can obtain a trained neural network according to the present disclosure from memory on the mobile device, the battery, and/or from a secondary device (e.g., cloud). For example, cloud storage can be utilized to keep a copy of a trained neural network according to the present disclosure. The mobile device can be configured to receive an observed geo-location from a location-enabled battery, a fixed location beacon, or a GPS, or combinations thereof.

Figure 7:
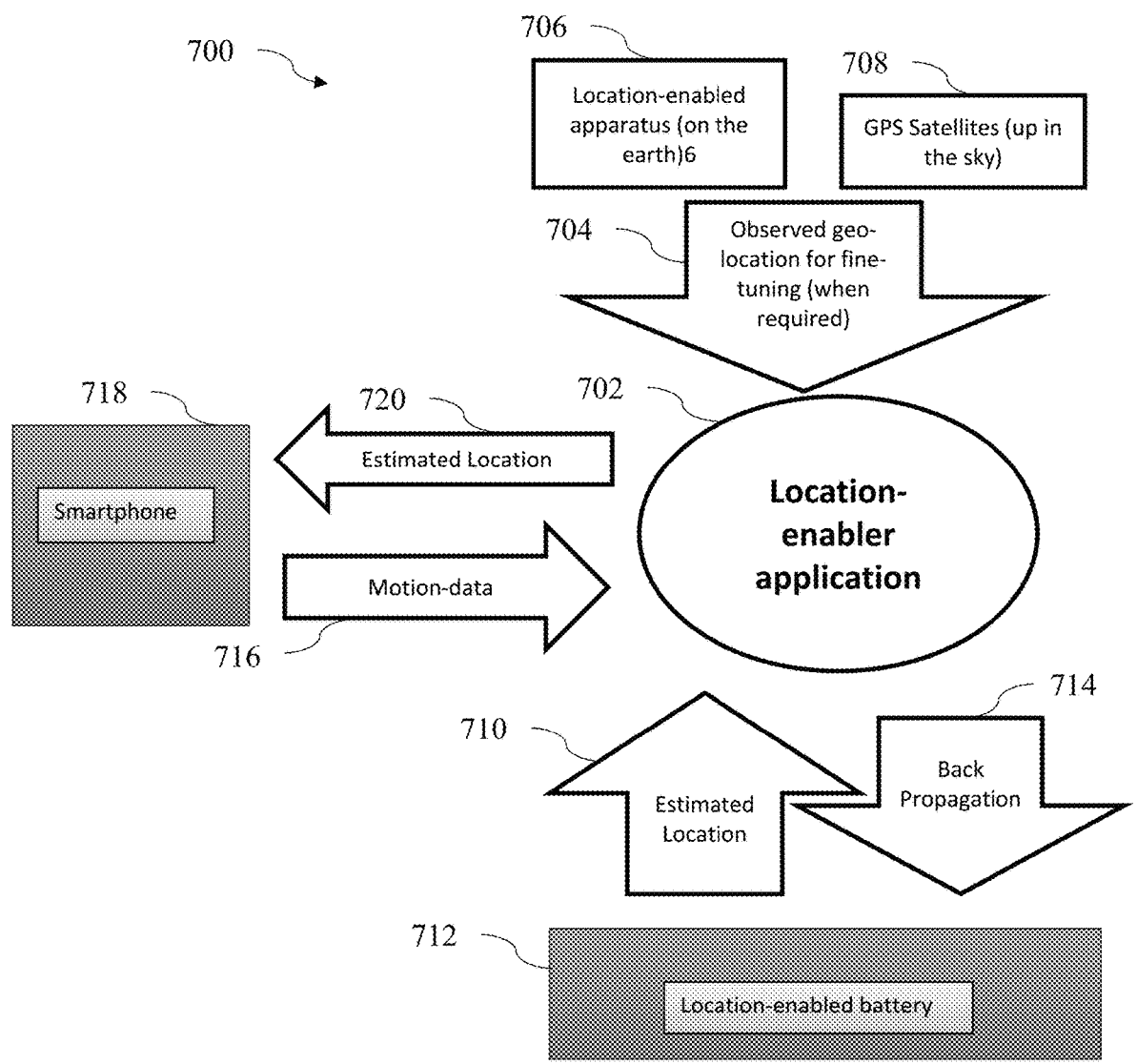
FIG. 7 illustrates an example of a process diagram for a mobile device comprising the functionality of the location-enabled apparatus according to the present disclosure integrated within a location-enabled battery and a location-enabler application.

In various examples, the NOGPS app can periodically determine if further fine-tuning of the neural network according to the present disclosure should be performed by comparing the second geo-location with an observed geo-location. The functions of the NOGPS app in FIG. 7 are substantially similar to the functions of the NOGPS app in FIG. 8, except that the geo-location in FIG. 7 can be constantly updated since the location-enabled battery can be remain in an "ON" state even if the mobile device is switched "OFF".

The location-enabled apparatus according to the present disclosure can be a component or a portion of various other devices. For example, a mobile device, a fastener, a marker, a doorbell, or an anti-theft device, or combinations thereof can comprise the location-enabled apparatus according to the present disclosure. For example, an anti-theft device can comprise the location-enabled apparatus according to the present disclosure and a secured memory for storing the current geo-location. Various devices, such as, for example, a cellular phone, can sniff out a BLE transmission of a geo-location and can compare the transmitted geo-location of the anti-theft device to a current geo-location of the cellular phone. Thus, if the anti-theft is outside of a designated area (or inside of a restricted area), the cellphone can transmit an alert. Alternatively, the anti-theft device can determine utilizing the neural network and the sensor of the location-enabled apparatus according to the present disclosure when the antitheft device is outside of a designated area or inside of a restricted area and transmit an alert. The anti-theft device can be battery-less (e.g., include an energy harvesting device) and hidden deep inside an object which needs to be secured against theft.

In various examples, the apparatus according to the present disclosure can be securely affixed to a wall, a road, a pathway, a shop, an office, a counter, a building, or a desk, or combinations thereof. The securely affixed apparatus can transmit its current geo-location to other apparatus or device or combinations thereof. The marker can comprise a cat-eye, a bumper sticker, a sign post, a house number, a name plate, or a street sign, or combinations thereof among others. For example, a house number or name plate or combination thereof, can be issued by a designated official (e.g., a city office) and pre-programed to transmit a specific geo-location of a location that the house number or name plate or combinations thereof will be installed.

The location-enabled apparatus according to the present disclosure may be installed on a road similar to how a cat-eye is installed on a road. For example, the location-enabled apparatus according to the present disclosure can be installed atop a fastener (e.g., a nail, a screw) driven into the road. The fastener can define a cavity in a head of the fastener, so that the location-enabled apparatus according to the present disclosure can be securely affixed in the cavity. The location-enabled apparatus according to the present disclosure can be affixed in the cavity after installing the fastener.

In examples where the location-enabled apparatus according to the present disclosure can convert vibrations into power, the apparatus can be installed into a road by drilling a hole and introducing the apparatus to the hole. The hole can then be sealed with a fast-setting durable epoxy. Thereafter, when a car approaches the location-enabled apparatus according to the present disclosure installed in the road, the vibrating road can power the apparatus which in-turn broadcasts the second geo-location.

In various examples, a toy can be configured with a location-enabled apparatus according to the present disclosure and the toy can operate differently depending on its geo-location. For example, the toy can be considered intelligent and the toy can speak French when the current geo-location of the toy is in France and the toy can speak English when the current geo-location of the toy is in United Kingdom.

Referring back to FIG. 1, in various examples, the apparatus 100 can also transmit a message. For example, the receiver 106 can receive a message that can be stored in memory 104 and the message can be transmitted by the transmitter 108. For example, around a desk, the transmitter 108 can transmit the message of "don't make noise, around this desk." This message can be sent to the receiver 106 utilizing a mobile device or other device. The apparatus 100 can be used in various applications, such as, for example, navigation, proximity applications, or gaming applications, or combinations thereof.

A "Smart Bumper Sticker" comprising the location-enabled apparatus according to the present disclosure can be initialized by a companion app on smartphone which can transmit (e.g., seed) an initial geo-location into the memory of the Smart Bumper Sticker. When a sensor inside the Smart Bumper Sticker detects any movement, the processor of the Smart Bumper Sticker can update the geo-location of the Smart Bumper Sticker utilizing the neural network. Updating the geo-location of a device can utilize Newton's laws of motion.

After seeding an initial geo-location into the memory of the Smart Bumper Sticker, periodic re-seeding of an observed geo-location different from the initial geo-location can be transmitted to the Smart Bumper Sticker and utilized to train the neural network on the Smart Bumper Sticker (e.g., make the neural network "smarter" or "more accurate" in geo-location estimation). For example, a person may initialize the Smart Bumper Sticker at the location of their primary residence (e.g., home), then at the location of where they work, a location of a friend's house, or location of another's person house (e.g., relatives) or other locations. Each time an observed geo-location is provided to the Smart Bumper Sticker, the Smart Bumper Sticker can become smarter and more accurate when determining a second geo-location.

The location-enabled apparatus according to the present disclosure can be configured as a fixed-location beacon (e.g., the second geo-location is the same as the first geo-location and does not change because the beacon is at a fixed pose) which can comprise a battery or can be a battery-less energy harvesting device or a moving-location beacon (e.g., the second geo-location changes as the beacon moves) which can comprise a battery or can be a battery-less energy harvesting device or combinations thereof.

A mobile device can use the fixed-location beacons to obtain an observed geo-location to fine-tune a neural network of a location-enabled apparatus embedded in the mobile device. The mobile device can obtain the training data and/or observed geo-location using various wireless communication protocols.

The location-enabled apparatus according to the present disclosure can be configured in a network of at least two nodes or at least three nodes. For example, a network 900 of nodes is provided in FIG. 9. The nodes can be configured to form a mesh network, whereby each node is able to negotiate its current geo-location with respect to its neighboring nodes. The nodes can negotiate their current geo-location utilizing a Duly Authenticated, Mutually Negotiated (DAMN) protocol. Once a node has successfully negotiated its current geo-location, the node can be an Authenticated Location Server (ALS). Nodes may be positioned within the network based on the demand for their particular functions (e.g., routing, messaging). In various examples, the network may also comprise a server.

The location-enabled apparatus according to the present disclosure can be configured as a node of a network 900, such as, for example, a router node, a basic node, a service provider node, or a service requester node, or combinations thereof. Each node can comprise a receiver configured to receive a geo-location of the respective node and/or a neighboring node. Each node can comprise a transmitter configured to output the geo-location of the respective node.

A router node can be configured to route communication from one of the nodes to a different one of the nodes. A basic node can transmit a second geo-location (e.g., the current location of the basic node). The basic node may be a low power node and may not comprise a GPS receiver. A service requester node can be a mobile device comprising a receiver, a sensor, and a processor. The service requester node can be configured to determine the current geo-location of the service requester node based on the second geo-location output from at least one of the respective nodes in the network and the sensor of the service requester node utilizing a neural network.

Each node can comprise a transmitting power of class 1, class 2, class 3, or class 4 as illustrated in Table 1 below.

TABLE 1

| Class | Max permitted power | | Typ. Range (m) |
| --- | --- | --- | --- |
| | (mW) | (dBm) | |
| 1 | 100 | 20 | ~100 |
| 2 | 2.5 | 4 | ~10 |
| 3 | 1 | 0 | ~1 |
| 4 | 0.5 | −3 | ~0.5 |

For example, each node may have a communication range of 1,000 meters or less, such as, for example, 500 meters or less, 100 meters or less, 10 meters or less, 1 meter or less, or 0.5 meters or less. In various examples, each node may have a communication range of at least 0.1 meters, such as, for example, at least 0.5 meters, at least 1 meter, at least 10 meters, at least 100 meters, or at least 500 meters. The nodes may not communication with a global positioning satellite or other object greater than 100 miles from the surface of the earth in order to determine their current geo-location.

A service provider node can transmit a message in addition to the second geo-location. The message can be a short message service or a very short message service. The message can contain an advertisement. For example, the service provider node may be used to advertise a desired service over the network 900 in FIG. 9. Nodes neighboring the service provider node may be capable of routing this advertisement to a desired node.

Figure 9:
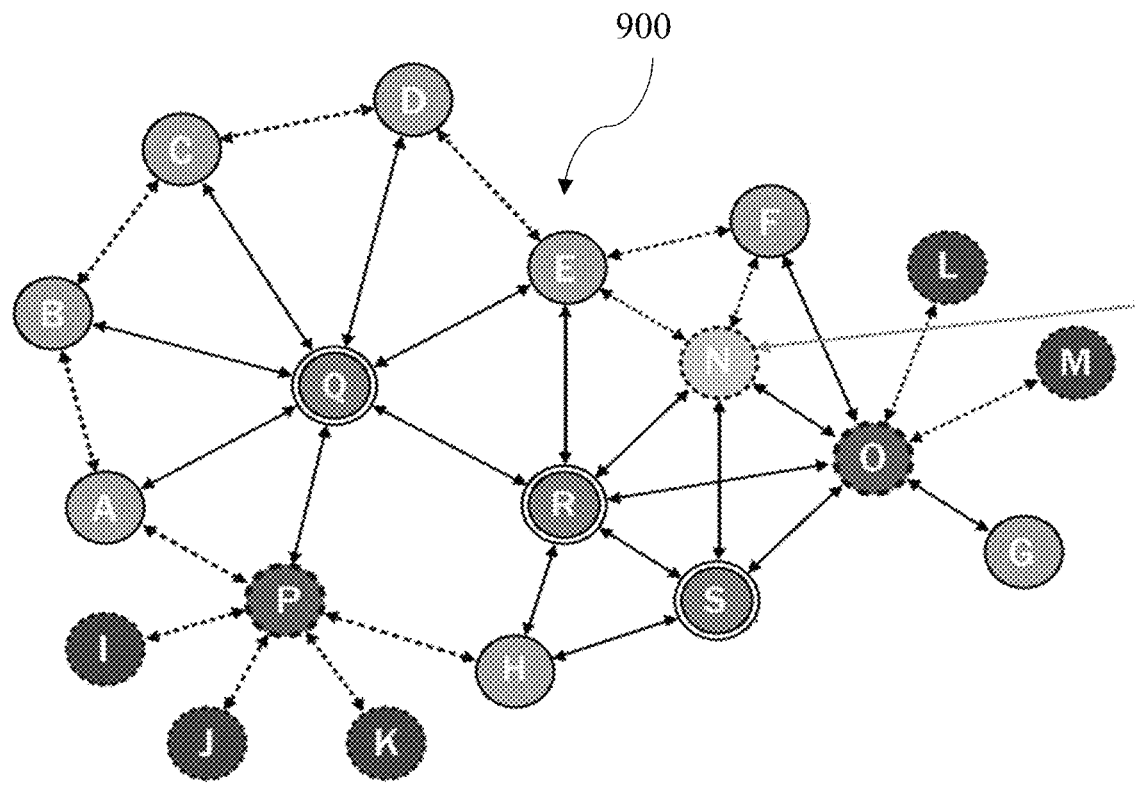
FIG. 9 illustrates an example of a system diagram of a network of nodes for determining a geo-location according to the present disclosure.

As illustrated in FIG. 9, nodes Q, R, and S are router nodes, nodes A, B, C, D, E, F, G, H, I, J, K, L, and M are basic nodes, nodes O and P are service provider nodes, and node N is a service requester node.

Physical objects may not know their physical location. The present inventor has provided a location-enabled apparatus, which can provide the geo-location to the physical objects with minimal power consumption and a low energy requirement so they can perform location-aware functions. Such objects are "smart objects" because they can perform intelligent functions based on their context (e.g., pose).

Powered location-enabled apparatus according to the present disclosure can store their current geo-location in available memory and update their geo-location as desired. Unpowered objects can utilize an energy-harvesting device to provide power to the location-enabled apparatus according to the present disclosure. However, unpowered objects may not know their current geo-location because they do not have memory to receive and store the geo-location. However, a power location-enabled apparatus according to the present disclosure or other location aware apparatus can store the relative geo-location of the unpowered objects with reference to its own current geo-location. Thus, the unpowered object can receive their current geo-location from the power location-enabled apparatus according to the present disclosure and perform intelligent functions based on their context.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. In addition, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain functions and/or operations, it will be understood by those skilled in the art that each function and/or operation within such block diagrams, flowcharts, and/or examples can be implemented, individually and/or collectively, by a wide range of hardware, software, firmware, or virtually any combination thereof. Those skilled in the art will recognize that some examples of the forms disclosed herein, in whole or in part, can be equivalently implemented in integrated circuits, as a computer program running on a computer (e.g., as a programs running on a computer system), as a program running on a processor (e.g., as a program running on a microprocessor), as firmware, or as virtually any combination thereof, and that designing the circuitry and/or writing the code for the software and or firmware would be well within the skill of one skilled in the art in light of this disclosure. In addition, those skilled in the art will appreciate that the mechanisms of the subject matter described herein are capable of being distributed as a program product in a variety of forms, and an illustrative form of the subject matter described herein applies regardless of the particular type of signal bearing medium used to actually carry out the distribution.

Instructions used to program logic to perform various disclosed examples can be stored within a memory in the system, such as dynamic random access memory (DRAM), cache, flash memory, or other storage. Furthermore, the instructions can be distributed via a network or by way of other computer-readable media. Thus a machine-readable medium may include any mechanism for storing or transmitting information in a form readable by a machine (e.g., a computer), including, but not limited to, floppy diskette, optical disk, compact disc read-only memory (CD-ROM), magneto-optical disk, read-only memory (ROM), random access memory (RAM), erasable programmable read-only memory (EPROM), electrically erasable programmable read-only memory (EEPROM), magnetic or optical card, flash memory, or a tangible, machine-readable storage used in the transmission of information over the Internet via electrical, optical, acoustical, or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or FPGA), state machine circuitry, firmware that stores instructions executed by programmable circuitry, and any combination thereof. The control circuit may, collectively or individually, be embodied as circuitry that forms part of a larger system, for example, an IC, an ASIC, a SoC, desktop computers, laptop computers, tablet computers, servers, smart phones, etc. Accordingly, as used herein, "control circuit" includes, but is not limited to, electrical circuitry having at least one discrete electrical circuit, electrical circuitry having at least one IC, electrical circuitry having at least one application-specific IC, electrical circuitry forming a general-purpose computing device configured by a computer program (e.g., a general-purpose computer configured by a computer program that at least partially carries out processes and/or devices described herein or a microprocessor configured by a computer program that at least partially carries out processes and/or devices described herein), electrical circuitry forming a memory device (e.g., forms of RAM), and/or electrical circuitry forming a communications device (e.g., a modem, communications switch, or optical-electrical equipment). Those having skill in the art will recognize that the subject matter described herein may be implemented in an analog or digital fashion or some combination thereof.

As used herein, the term "logic" may refer to an app, software, firmware, and/or circuitry configured to perform any of the aforementioned operations. Software may be embodied as a software package, code, instructions, instruction sets, and/or data recorded on non-transitory computer-readable storage medium. Firmware may be embodied as code, instructions or instruction sets, and/or data that are hard-coded (e.g., nonvolatile) in memory devices.

As used herein, the terms "component," "system," "module," and the like can refer to a computer-related entity, either hardware, a combination of hardware and software, software, or software in execution.

As used herein, an "algorithm" refers to a self-consistent sequence of steps leading to a desired result, where a "step" refers to a manipulation of physical quantities and/or logic states that may, though they need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol, which may be capable permitting communication using a Transmission Control Protocol/Internet Protocol (TCP/IP). The Ethernet protocol may comply or be compatible with the Ethernet standard published by the Institute of Electrical and Electronics Engineers (IEEE), titled "IEEE 802.3 Standard," published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001 and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

A component may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to"). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A," "B," or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Any patent application, patent, non-patent publication, or other disclosure material referred to in this specification is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

Various aspects of the invention according to the present disclosure include, but are not limited to, the aspects listed in the following numbered clauses.

1. An apparatus for determining a geo-location, the apparatus comprising:
a receiver configured to receive a first geo-location;
a sensor configured to determine a change in a pose of the apparatus;
a processor operatively coupled to memory, the receiver, and the sensor, wherein the processor is configured to determine a second geo-location based on the first geo-location and the sensor utilizing a neural network; and a first transmitter configured to output the second geo-location of the apparatus.
2. The apparatus of clause 1, further comprising an energy harvesting device comprising a piezoelectric energy harvesting device, an electrostatic energy harvesting device, an electromagnetic energy harvesting device, a photovoltaic cell, or a radio frequency energy harvesting device, or combinations thereof.
3. The apparatus of any on of clauses 1-2, further comprising a battery, and wherein the neural network is embedded in the battery.
4. The apparatus of any one of clause 1-3, wherein the receiver is configured to receive the first geo-location via a first wireless communication protocol and the first transmitter is configured to output the second geo-location via a second wireless communication protocol.
5. The apparatus of clause 4, wherein each wireless communication protocol comprises a near field communication protocol, a Bluetooth low energy protocol, a Wi-Fi protocol, or a ZigBee protocol, or combinations thereof.
6. The apparatus of clause 4, wherein the first wireless communication protocol comprises a near field communication protocol and the second wireless communication protocol comprises a Bluetooth low energy protocol.
7. The apparatus of any one of clauses 1-6, wherein the sensor comprises an accelerometer, an inertial measurement unit, a gyroscope, or a magnetometer, or combinations thereof.
8. The apparatus of any one of clauses 1-7, wherein the memory is secure memory.
9. A mobile device, a fastener, a marker, a doorbell, or an anti-theft device, or combinations thereof comprising the apparatus of any one of clauses 1-8.
10. The apparatus of any one of clauses 1-9, wherein the processor is configured to store the second location in the memory.
11. The apparatus of any one of clauses 1-10, wherein the first transmitter is configured to transmit a message.
12. The apparatus of any one of clauses 1-11, wherein the first geo-location is stored in the memory and the processor is configured to overwrite the first geo-location with the second geo-location.
13. The apparatus of any one of clauses 1-12, wherein the receiver is further configured to receive an observed geo-location and the processor is configured to train the neural network with the observed geo-location.
14. The apparatus of clause 13, wherein the processor configured to train the neural network comprises the processor configured to adjust weights and biases in the neural network.
15. The apparatus of any one of clauses 13-14, wherein the receiver is configured to receive the observed geo-location from a node comprising:

a second transmitter configured to output a current geo-location of the node as the observed geo-location via a wireless communication protocol, wherein the wireless communication protocol comprises a near field communication protocol, a Bluetooth low energy protocol, a Wi-Fi protocol, or a ZigBee protocol, or combinations thereof.

16. The apparatus of any one of clauses 1-15, further comprising a global positioning system configured to provide an observed geo-location to the processor to train the neural network.

17. A network for determining a geo-location, the network comprising:
  a node comprising:
    a first transmitter configured to output a current geo-location of the node via a wireless communication protocol, wherein the wireless communication protocol comprises a near field communication protocol, a Bluetooth low energy protocol, a Wi-Fi protocol, or a ZigBee protocol, or combinations thereof; and
  a mobile device comprising:
    a receiver configured to receive the current geo-location of the node via the wireless communication protocol;
    a sensor configured to determine a change in a pose of the mobile device; and
    a processor operatively coupled to memory, the receiver, and the sensor, wherein the processor is configured to determine a current geo-location of the mobile device based on the current geo-location of the node and the sensor utilizing a neural network.

18. The system of clause 17, further comprising at least two nodes.

19. The system of clause 18, wherein the at least two nodes form a mesh network.

20. The system of any one of clauses 18-19, wherein at least one of the nodes is configured to transmit a message.

21. The system of any one of clauses 18-20, wherein at least one of the nodes is configured to route communication from one of the nodes to a different one of the nodes or the mobile device, or combinations thereof.

22. The system of any one of clauses 18-21, further comprising at least one of the nodes configured to determine the geo-location of the node utilizing a duly authenticated mutually negotiated protocol.

In summary, numerous benefits have been described that result from employing the concepts described herein. The foregoing description has been presented for purposes of illustration and description. It is not intended to be exhaustive or limiting to the precise examples disclosed. Modifications or variations are possible in light of the above teachings. The examples were chosen and described in order to illustrate principles and practical application to thereby enable one of ordinary skill in the art to utilize the various examples and with various modifications as are suited to the particular use contemplated. It is intended that the claims submitted herewith define the overall scope.

What is claimed is:

1. An apparatus for determining a geo-location, the apparatus comprising:
  a receiver configured to receive a first geo-location;
  a sensor configured to determine a change in a pose of the apparatus;
  a processor operatively coupled to memory, the receiver, and the sensor, wherein the processor is configured to determine a second geo-location based on the first geo-location and the sensor utilizing a neural network;
  a first transmitter configured to output the second geo-location of the apparatus; and
  a battery, wherein the neural network is embedded in the battery.

2. The apparatus of claim 1, further comprising an energy harvesting device comprising a piezoelectric energy harvesting device, an electrostatic energy harvesting device, an electromagnetic energy harvesting device, a photovoltaic cell, or a radio frequency energy harvesting device, or combinations thereof.

3. The apparatus of claim 1, wherein the receiver is configured to receive the first geo-location via a first wireless communication protocol and the first transmitter is configured to output the second geo-location via a second wireless communication protocol.

4. The apparatus of claim 3, wherein each wireless communication protocol comprises a near field communication protocol, a Bluetooth low energy protocol, a Wi-Fi protocol, or a ZigBee protocol, or combinations thereof.

5. The apparatus of claim 3, wherein the first wireless communication protocol comprises a near field communication protocol and the second wireless communication protocol comprises a Bluetooth low energy protocol.

6. The apparatus of claim 1, wherein the sensor comprises an accelerometer, an inertial measurement unit, a gyroscope, or a magnetometer, or combinations thereof.

7. The apparatus of claim 1, wherein the memory is secure memory.

8. A mobile device, a fastener, a marker, a doorbell, or an anti-theft device, or combinations thereof comprising the apparatus of claim 1.

9. The apparatus of claim 1, wherein the processor is configured to store the second geo-location in the memory.

10. The apparatus of claim 1, wherein the first transmitter is configured to transmit a message.

11. The apparatus of claim 1, wherein the first geo-location is stored in the memory and the processor is configured to overwrite the first geo-location with the second geo-location.

12. The apparatus of claim 1, wherein the receiver is further configured to receive an observed geo-location and the processor is configured to train the neural network with the observed geo-location.

13. The apparatus of claim 12, wherein the processor configured to train the neural network comprises the processor configured to adjust weights and biases in the neural network.

14. The apparatus of claim 12, wherein the receiver is configured to receive the observed geo-location from a node comprising:
  a second transmitter configured to output a current geo-location of the node as the observed geo-location via a wireless communication protocol, wherein the wireless communication protocol comprises a near field communication protocol, a Bluetooth low energy protocol, a Wi-Fi protocol, or a ZigBee protocol, or combinations thereof.

15. The apparatus of claim 1, further comprising a global positioning system configured to provide an observed geo-location to the processor to train the neural network.

16. An apparatus for determining a geo-location, the apparatus comprising:
  a receiver configured to receive a first geo-location via a first wireless communication protocol;
  a sensor configured to determine a change in a pose of the apparatus;
  a processor operatively coupled to memory, the receiver, and the sensor, wherein the processor is configured to determine a second geo-location based on the first geo-location and the sensor utilizing a neural network;

a first transmitter configured to output the second geo-location of the apparatus via a second wireless communication protocol, wherein each wireless communication protocol comprises a near field communication protocol, a Bluetooth low energy protocol, a Wi-Fi protocol, or a ZigBee protocol, or combinations thereof; and a battery, wherein the neural network is embedded in the battery.

17. The apparatus of claim 16, further comprising an energy harvesting device comprising a piezoelectric energy harvesting device, an electrostatic energy harvesting device, an electromagnetic energy harvesting device, a photovoltaic cell, or a radio frequency energy harvesting device, or combinations thereof.

18. The apparatus of claim 16, wherein the first wireless communication protocol comprises a near field communication protocol and the second wireless communication protocol comprises a Bluetooth low energy protocol.

19. The apparatus of claim 16, wherein the sensor comprises an accelerometer, an inertial measurement unit, a gyroscope, or a magnetometer, or combinations thereof.

20. The apparatus of claim 16, wherein the memory is secure memory.

21. A mobile device, a fastener, a marker, a doorbell, or an anti-theft device, or combinations thereof comprising the apparatus of claim 16.

22. The apparatus of claim 16, wherein the processor is configured to store the second geo-location in the memory.

23. The apparatus of claim 16, wherein the first transmitter is configured to transmit a message.

24. The apparatus of claim 16, wherein the first geo-location is stored in the memory and the processor is configured to overwrite the first geo-location with the second geo-location.

25. The apparatus of claim 16, wherein the receiver is further configured to receive an observed geo-location and the processor is configured to train the neural network with the observed geo-location.

26. The apparatus of claim 25, wherein the processor configured to train the neural network comprises the processor configured to adjust weights and biases in the neural network.

27. The apparatus of claim 25, wherein the receiver is configured to receive the observed geo-location from a node comprising:

a second transmitter configured to output a current geo-location of the node as the observed geo-location via a wireless communication protocol, wherein the wireless communication protocol comprises a near field communication protocol, a Bluetooth low energy protocol, a Wi-Fi protocol, or a ZigBee protocol, or combinations thereof.

28. The apparatus of claim 16, further comprising a global positioning system configured to provide an observed geo-location to the processor to train the neural network.

29. An apparatus for determining a geo-location, the apparatus comprising:

a receiver configured to receive a first geo-location and an observed geo-location;

a sensor configured to determine a change in a pose of the apparatus;

a processor operatively coupled to memory, the receiver, and the sensor, wherein the processor is configured to determine a second geo-location based on the first geo-location and the sensor utilizing a neural network, and wherein the process is configured to train the neural network with the observed geo-location comprising the processor configured to adjust weights and biases in the neural network;

a first transmitter configured to output the second geo-location of the apparatus; and a battery, wherein the neural network is embedded in the battery.

30. The apparatus of claim 29, further comprising an energy harvesting device comprising a piezoelectric energy harvesting device, an electrostatic energy harvesting device, an electromagnetic energy harvesting device, a photovoltaic cell, or a radio frequency energy harvesting device, or combinations thereof.

31. The apparatus of claim 29, wherein the sensor comprises an accelerometer, an inertial measurement unit, a gyroscope, or a magnetometer, or combinations thereof.

32. The apparatus of claim 29, wherein the memory is secure memory.

33. A mobile device, a fastener, a marker, a doorbell, or an anti-theft device, or combinations thereof comprising the apparatus of claim 29.

34. The apparatus of claim 29, wherein the processor is configured to store the second geo-location in the memory.

35. The apparatus of claim 29, wherein the first transmitter is configured to transmit a message.

36. The apparatus of claim 29, wherein the first geo-location is stored in the memory and the processor is configured to overwrite the first geo-location with the second geo-location.

37. The apparatus of claim 29, wherein the receiver is configured to receive the observed geo-location from a node comprising:

a second transmitter configured to output a current geo-location of the node as the observed geo-location via a wireless communication protocol, wherein the wireless communication protocol comprises a near field communication protocol, a Bluetooth low energy protocol, a Wi-Fi protocol, or a ZigBee protocol, or combinations thereof.

38. The apparatus of claim 29, further comprising a global positioning system configured to provide the observed geo-location to the processor to train the neural network.

* * * * *